(12) United States Patent
Shih

(10) Patent No.: US 6,442,024 B1
(45) Date of Patent: Aug. 27, 2002

(54) FAN FLOW GUIDE

(76) Inventor: Shoei-Yuan Shih, No. 8, Lane 85, Hsing-I Rd., Pei-Tou Dist., Taipei (TW)

( * ) Notice: Subject to any disclaimer, the term of this patent is extended or adjusted under 35 U.S.C. 154(b) by 0 days.

(21) Appl. No.: 09/732,734

(22) Filed: Dec. 11, 2000

(51) Int. Cl.⁷ ................................................ H05K 7/20
(52) U.S. Cl. ....................... 361/695; 361/692; 361/697; 165/121; 454/184
(58) Field of Search ................................ 361/683, 687, 361/692, 694, 695, 696, 697, 699, 693, 702–710, 715; 454/184; 165/123, 104.33–34, 80.2, 80.3, 86, 185, 121–122; 257/722–727; 415/177–178; 174/16.3

(56) References Cited

U.S. PATENT DOCUMENTS

| | | | | |
|---|---|---|---|---|
| 5,495,389 A | * | 2/1996 | Dewitt et al. | 361/683 |
| 5,566,377 A | * | 10/1996 | Lee | 361/695 |
| 6,058,009 A | * | 5/2000 | Hood et al. | 361/687 |
| 6,134,108 A | * | 10/2000 | Patel et al. | 361/695 |
| 6,141,214 A | * | 10/2000 | Ahn | 361/687 |
| 6,253,834 B1 | * | 7/2001 | Sterner | 165/80.3 |
| 6,317,319 B1 | * | 11/2001 | Lewis et al. | 361/695 |
| 6,330,154 B1 | * | 12/2001 | Fryers et al. | 361/695 |
| 6,333,852 B1 | * | 12/2001 | Lin | 361/697 |

FOREIGN PATENT DOCUMENTS

JP    409218724 A  *  8/1997  ............. G06F/1/20

* cited by examiner

Primary Examiner—Darren Schuberg
Assistant Examiner—Michael Datskovsky
(74) Attorney, Agent, or Firm—Bacon & Thomas, PLLC

(57) ABSTRACT

A fan flow guide. The flow guide includes a wind inlet is connected to a wind outlet of a fan. A wind tube portion is installed between the wind inlet and a rear end of the computer host or a central processing unit. The thickness of the wind tube portion is smaller than that of the wind inlet so that airflow is compressed and accelerated to flow into the computer host and thus all parts dissipate heat substantially. Moreover, the thickness of the wind tube portion is sufficient to be disposed between the upper side of the memory (RAM) and computer host so as to achieve the object of sufficiently using the inner space of the computer host. Spacers are arranged in the wind tube portion for defining a plurality of air channels. The spacers have a curve shape so that adjacent spacers confine a thinner air channel. Therefore, the airflow is compressed and accelerated again.

9 Claims, 7 Drawing Sheets

US 6,442,024 B1

FAN FLOW GUIDE

BACKGROUND OF THE INVENTION

The present invention relates to a fan flow guide, and especially to a flow guide structure which can absorb the heat from the parts in the computer host and then exhaust the heat out of the computer host effectively.

In a general 1U specific industrial computer servo, since the hardware, central processing unit (CPU), and various data processing parts are compressed to a very narrow space. In order to match the complexity of the logic operation, the processing speed and performance are improved, but this will induce a high heat amount in processing. Furthermore, the inner space of the 1U is finite and under the consideration of cost, no more fan can be increased for enhancing the convection of airflow. Therefore, how to improve the current used fan to enhance the heat dissipation ratio has become a popular subject in the development of heat dissipation of a computer.

FIG. 1 shows a prior art fan structure, a heat dissipating structure of a computer, is disclosed in the inventor of the present invention. The fan structure has an effect of absorbing heat in the front section of a computer host and guiding the heat to other parts for dissipating heat. However, this prior art design has a defect of a lower speed as it is used in a large fan or a large heat dissipating range. And especially for a servo with two central processing units at the rear end of the casing of a host. Furthermore, due to the isolation of heat dissipating pieces, air returns in the servo and can not be exhausted out. For example, for a fan with a rotary speed of 3600 rpm (see FIG. 2), after testing by the inventor, the output speed of the fan is 8~10 M/sec. By the isolation of memory and effect of distance, the air speed in the central processing unit is about 2~3 M/sec. Since the isolation of heat dissipating piece, a rear end of the computer casing of a host is nearly zero. Therefore, although this prior art design can improve the defect of a prior art fan, but is unsuitable to a large fan or is used in a large heat dissipating space.

SUMMARY OF THE INVENTION

Accordingly, the primary object of the present invention is to provide a fan flow guide; wherein a flow guide structure is connected at the wind outlet of the fan for compressing and accelerating air and the output of the fan is extended to the central processing unit which will generate a high heat source. The flow guide structure comprises a wind inlet connected to a wind outlet of a fan; a wind tube portion being installed between the wind inlet and a rear end of the computer host or a central processing unit. The thickness of the wind tube portion is smaller than that of the wind inlet so that airflow is compressed and accelerated to flow into the computer host and thus all part dissipates heat substantially. Moreover, the thickness of the wind tube portion be disposed between the upper side of the memory (RAM) and computer host so as to achieve the object of sufficiently using the inner space of the computer host.

A further object of the present invention is to provide a fan flow guide, wherein a plurality of spacers are arranged in the wind tube portion for defining a plurality of air channels. The spacers has a curve shape so that adjacent spacers confines a thinner air channel. Therefore, the airflow is compressed and accelerated again.

A further object of the present invention is to provide a fan flow guide, wherein one end of the bottom plate of the flow guide structure is bent to be installed with a tilt portion with a plurality of wind outlet. Therefore, part airflow may be blown out from the wind outlet to be injected to the motherboard and memory and other chips.

The various objects and advantages of the present invention will be more readily understood from the following detailed description when read in conjunction with the appended drawing.

DETAILED DESCRIPTION OF THE PREFERRED EMBODIMENTS

Figure 3:
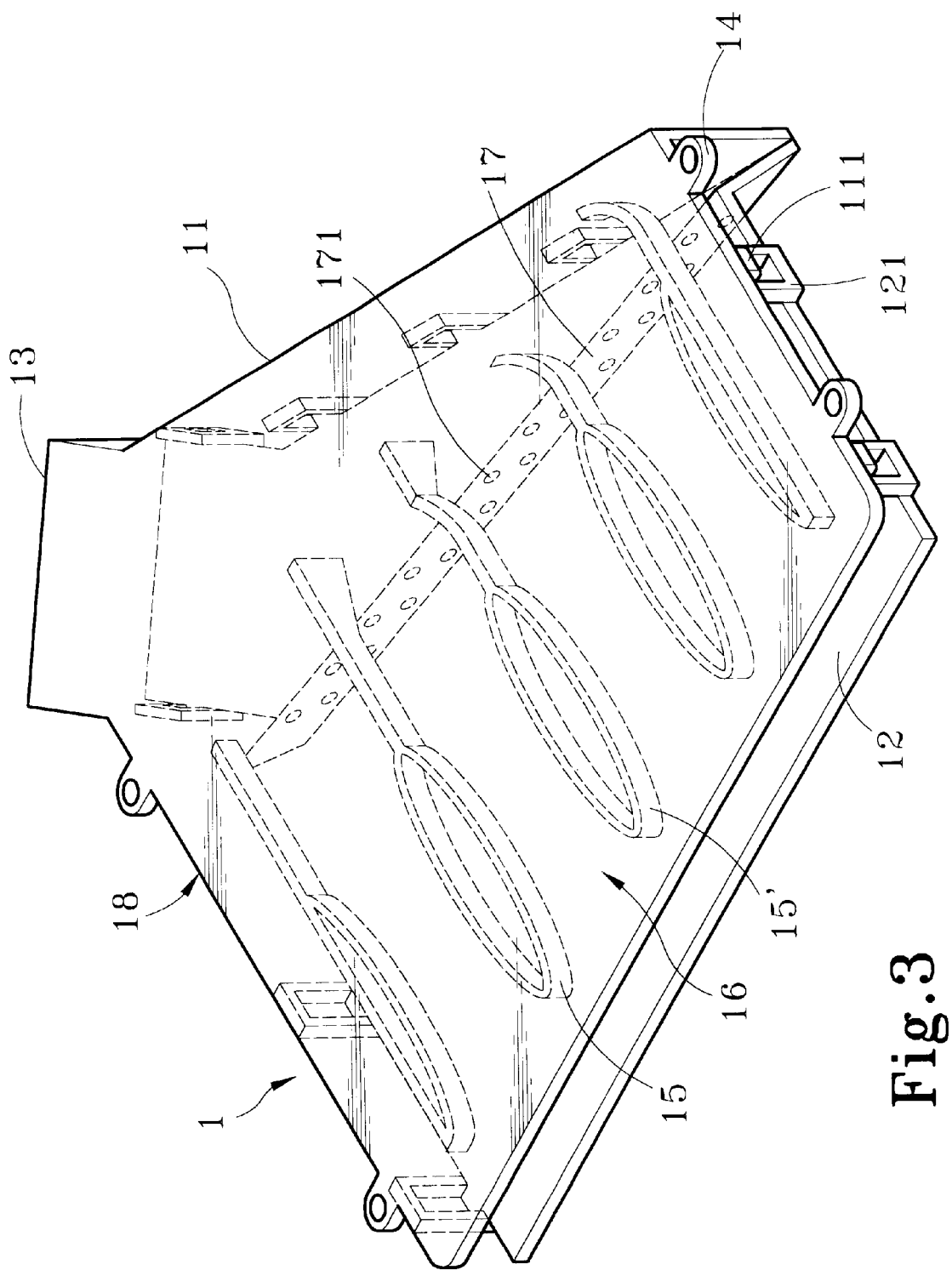
FIG. 3 is a schematic perspective view of the present invention.
Figure 4:
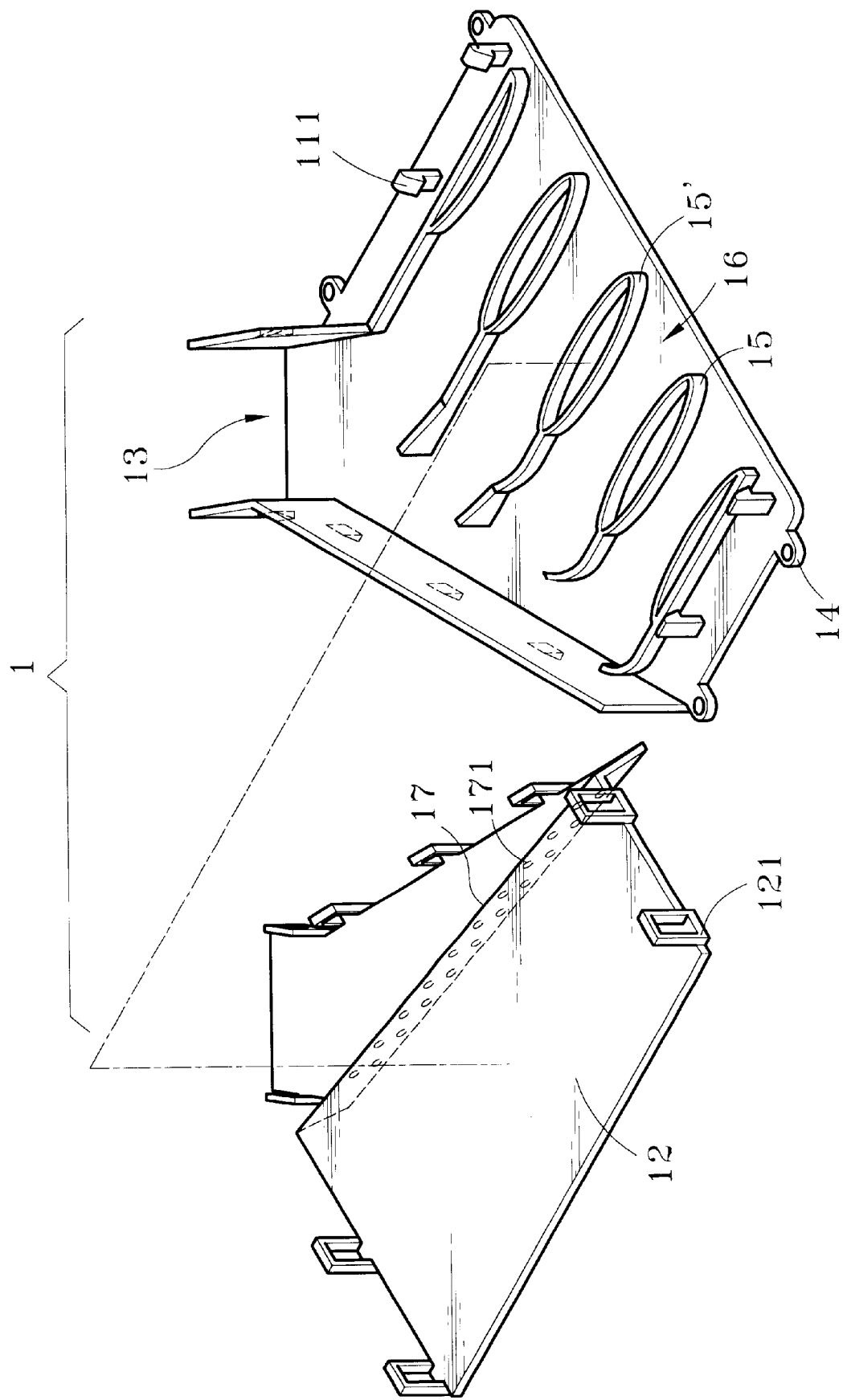
FIG. 4 is an exploded perspective view of the present invention.
Figure 5:
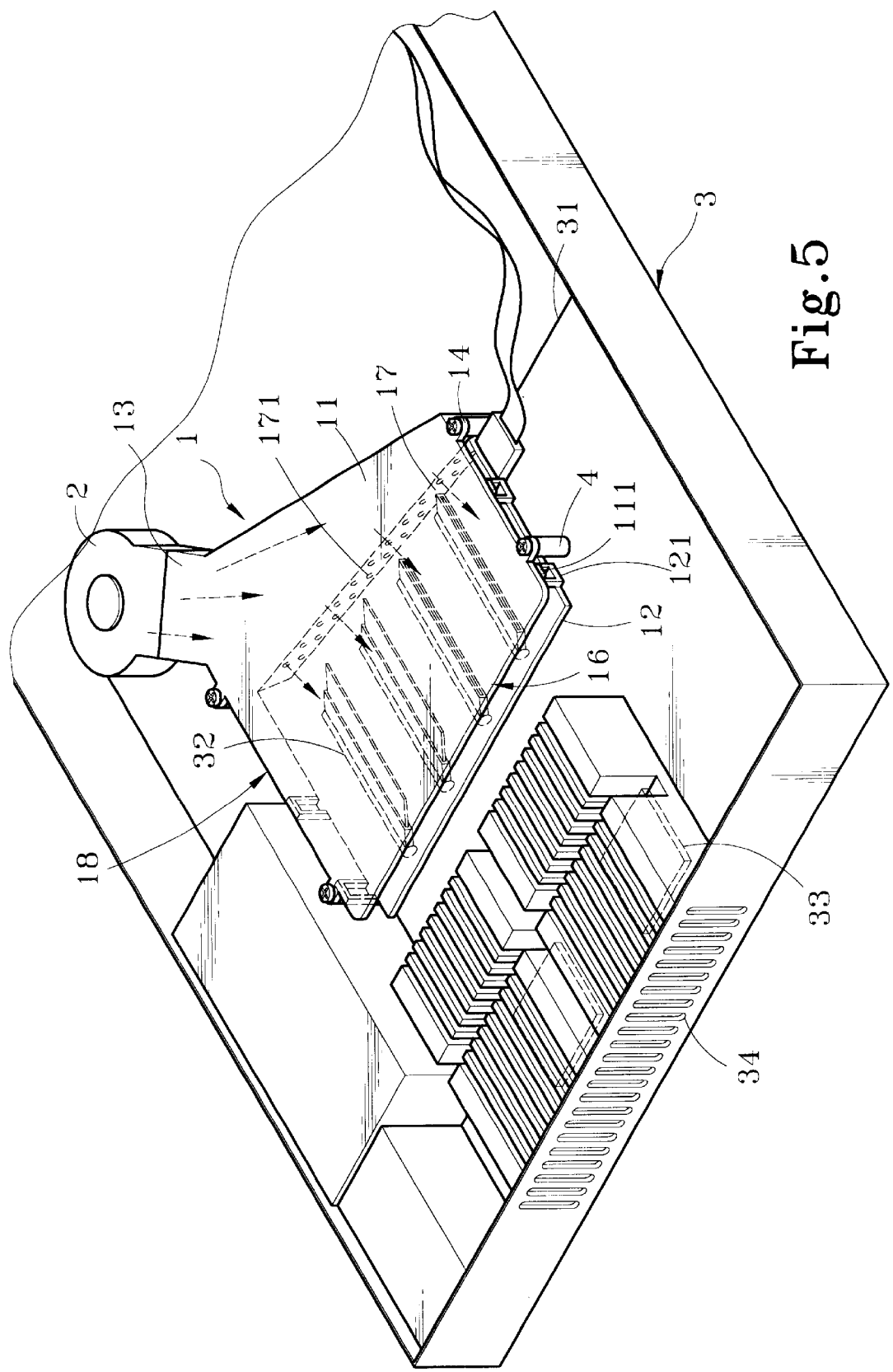
FIG. 5 is a schematic view showing an application of the present invention.

Referring to FIGS. 3, 4, and 5, the perspective view and schematic view of the present invention are illustrated. The fan flow guide of the present invention is connected to the outlet of a fan 2 for compressing and accelerating airflow. The fan flow guide has a cover plate 11 and a bottom plate 12. The peripheries thereof are installed with an ear portion 111 and a buckle 121 which are matched to one another and thus a flow guide structure 1 is formed, the flow guide structure 1 has an end installed with an wind inlet 13 which is assembled with the wind outlet of the fan 2. A wind tube portion 18 is installed between the wind inlet 13 and a rear end of the computer host 3 or a central processing unit 33. Since the thickness of the wind tube portion 18 is smaller than that of the wind inlet 13 so that airflow is compressed and accelerated to flow into the computer host 3 and thus all part dissipates heat substantially. Furthermore, the airflow absorbing heat can exhaust the heat to be out of the computer host 3. Moreover, the thickness thereof may be disposed between the upper side of the memory 32 (RAM) and computer host 3 so as to achieve the object of sufficiently using the inner space of the computer host 3. Moreover, the periphery of the wind tube portion 18 is installed with a plurality of retainer 14 so that the wind tube portion 18 can be fixed in the computer host 3 by the positioning piece 4 and the space in the mother board 31. A plurality of spacers 15, 15' are arranged in the wind tube portion 18 for defining a plurality of air channels 16. Since the spacers 15, 15' have a curve shape so that adjacent spacers 15, 15' confine a short air channel 16. Thus, airflow flows into the air channel 16 through the wind inlet 13 from the fan 2 so as to be compressed again. One end of the bottom plate 12 of the flow guide structure 1 is bent to be installed with a tilt portion 17 with a plurality of wind outlets 171. Therefore, part airflow may be blown out from the wind outlets 171 to be injected to the mother board 31 and memory 32 and other chips.

Figure 1:
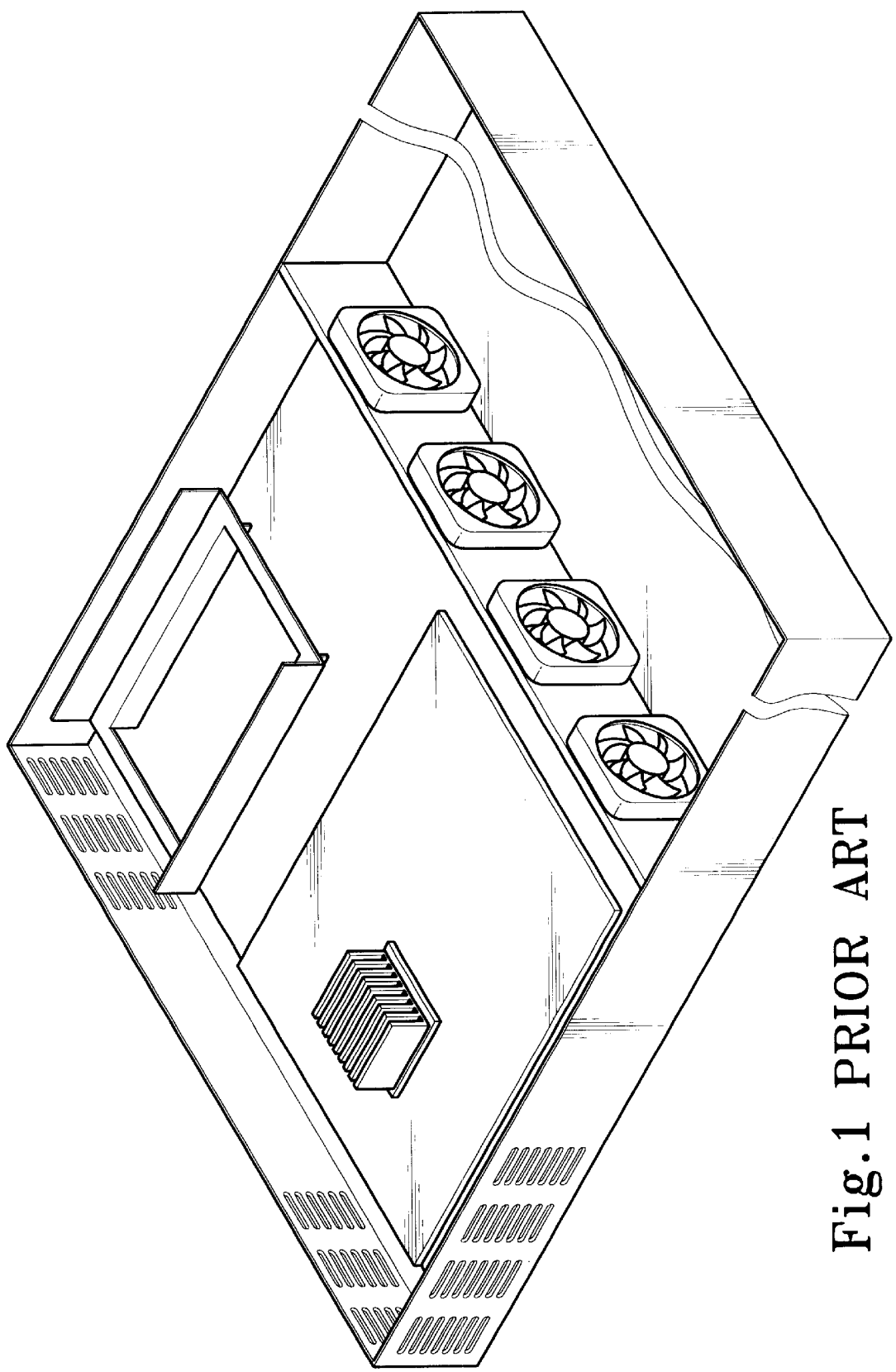
FIG. 1 is a schematic view showing the arrangement of a fan in the prior art servo.
Figure 2:
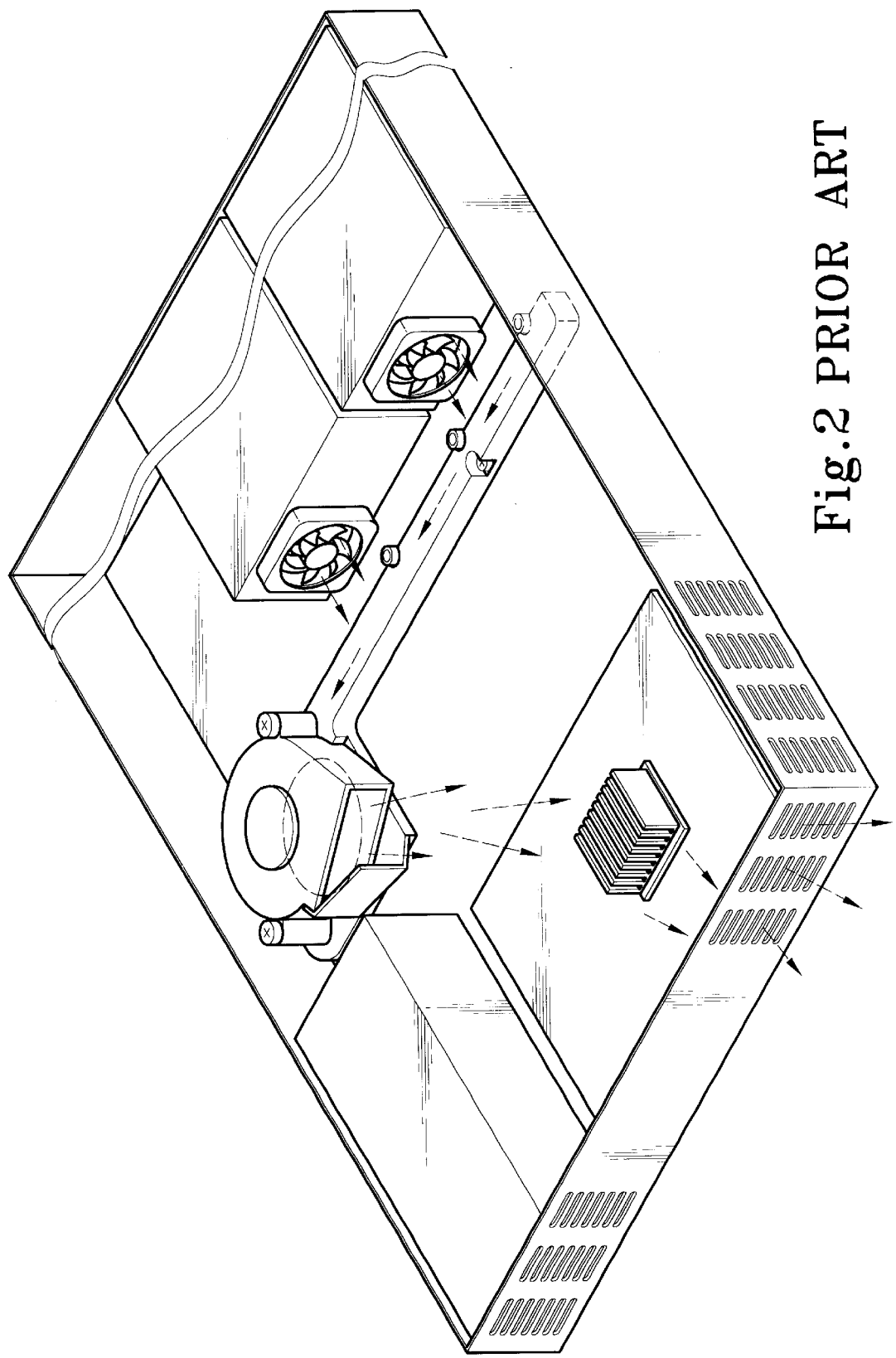
FIG. 2 is a schematic view showing the arrangement of a fan in the other prior art servo.
Figure 6:
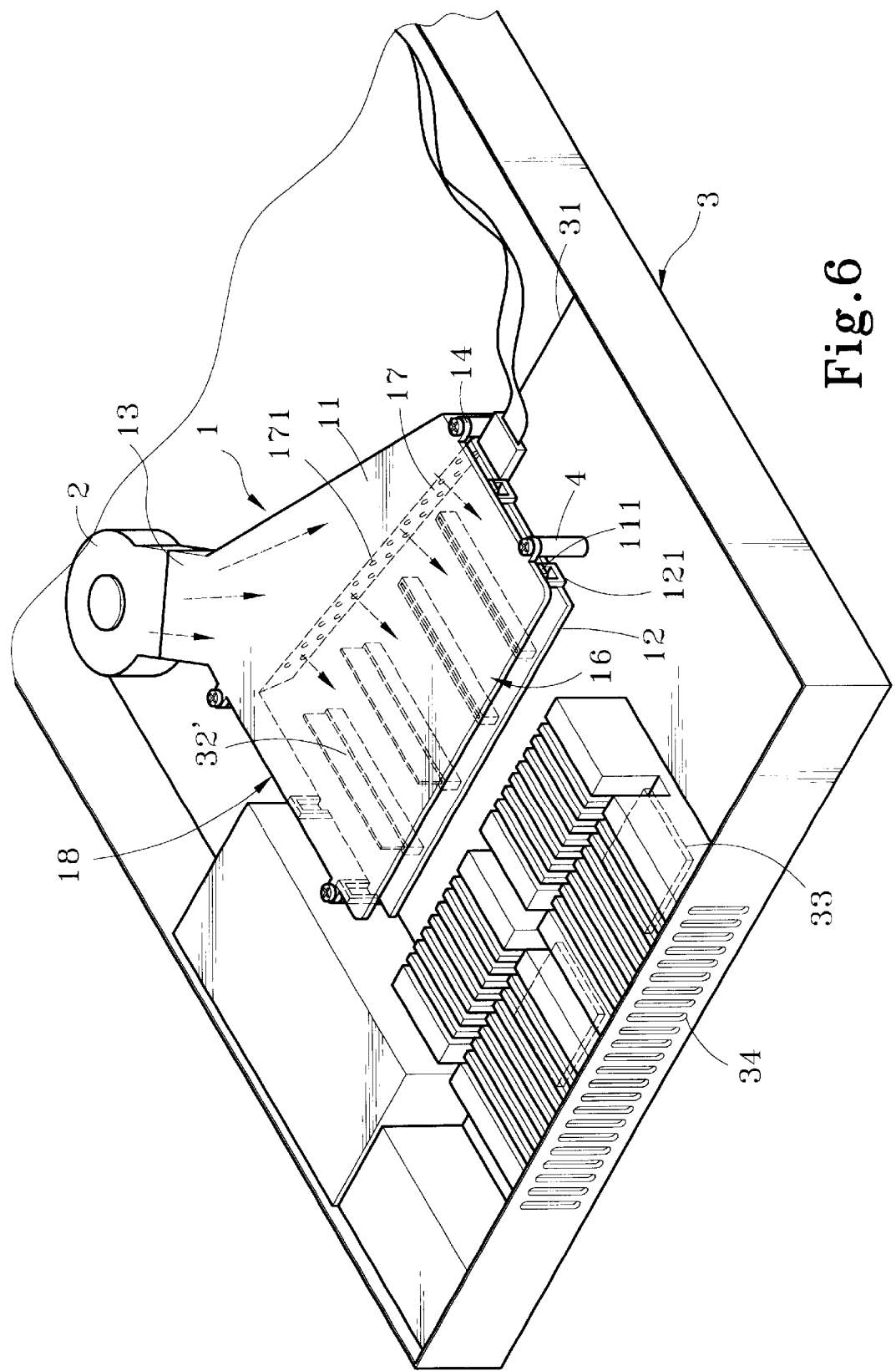
FIG. 6 is a schematic view showing another application of the present invention.
Figure 7:
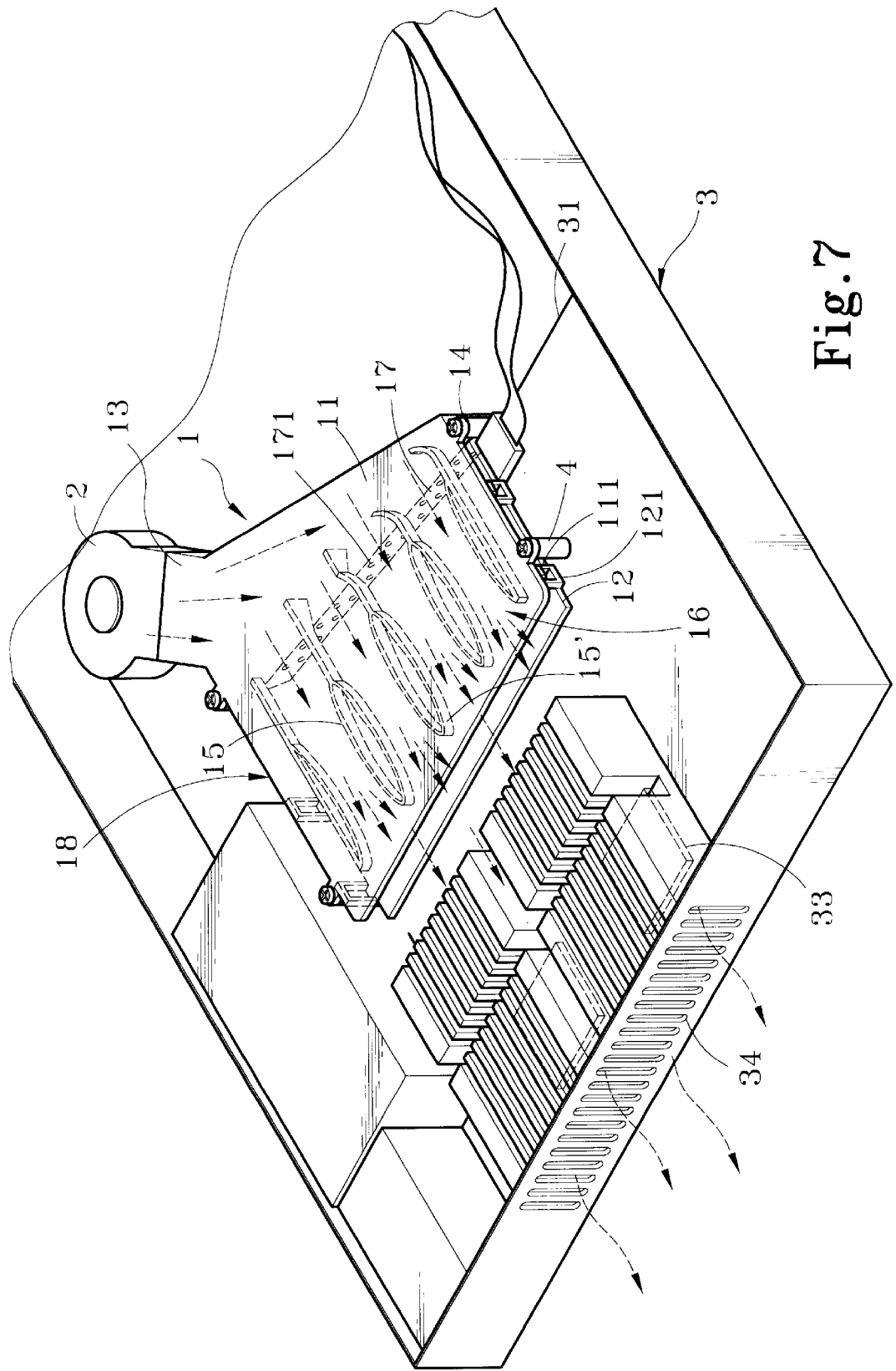
FIG. 7 is a schematic view showing the compression and acceleration of the airflow in the present invention.

Referring to FIGS. 2, 6 and 7, a schematic view showing the application of the present invention is illustrated. As shown in the figures, the bottom plate 12 and the cover plate 11 are buckled together and are formed with flow guide structure 1 having openings at two ends and a closing space in formed therein. By the positioning piece 4 to pass through the mother board 31, the wind inlet 13 in one end of the flow guide structure 1 is connected to the wind outlet of the fan 2 and is firmly secured thereon. Since the wind tube portion 18 is thinner and exactly run across between the memory 32' and computer host 3. It is known from FIGS. 5 and 6 that despite the format of the memory 32', the installation of the present invention cannot be effected and the space within the computer host 3 can be used sufficiently.

The airflow is from the operation of the fan 2. Then the airflow induces from the front section of the computer host 3 flows into the wind tube portion 18 through the wind inlet 13. Part of airflow flows through the wind outlet 171 of the tilt portion 17, and thus a jet airflow is generated to dissipate heat of the mother board 31 and memory 32 underlying the flow guide structure 1. Since the wind speed of the jet flow is stronger, the hot air absorbing the heat from aforesaid parts can be blown to the central processing unit 33 and dissipate heat thereof. In the first stage, most of the airflow is compressed and accelerated from the fan 2. Furthermore, the airflow is divided into a plurality of smaller airflow flowing toward the air channel 16 spaced by the spacers 15, 15', as illustrated in FIG. 6. Since the spacers 15, 15' have curved shape, part of the air channel 16 enclosed by the spacers 15, 15' is thinner. When air flows through the thinner section (such as the middle section illustrated in the drawing), since the section is shortened, the airflow will be compressed again so that the wind blowing to the rear section is accelerated. For example, for a fan 2 has a rotary speed of 3600 rpm, the wind outlet of the fan 2 has a speed of 8~10 M/sec, while it is compressed and accelerated as flowing through the wind tube portion 18 and spacers 15, 15' to the rear section of the air channel 16, so that the wind speed becomes 10~12 M/sec. The wind at the heat dissipating hole 34 and through the central processing unit 33 at a rear end of the computer host 3 has a speed of 2~2.5 M/sec. Therefore, the airflow can be brown to the parts of the computer host 3 to cause a better heat dissipation. Furthermore, the hot airflow in the heat source can be exhausted out of the computer host 3 so as to solve the heat dissipating problem in a mother board 31 having a central processing unit 33 with a speed large than 1 Ghz or with two central processing units 33.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fan flow guide comprising:

a wind inlet connected to a wind outlet of a fan;

a wind tube portion being installed between the wind inlet and a rear end of a computer host or a central processing unit;

a thickness of the wind tube portion being smaller than that of the wind inlet so that airflow is compressed and accelerated to flow into the computer host such that heat is dissipated;

the wind tube portion is disposed between an upper side of a memory that is positioned below the fan flow guide and the computer host;

wherein the flow guide has a cover plate and a bottom plate; and wherein a plurality of peripheries of the cover plate and the bottom plate are installed with an ear portion and a buckle which are matched to one another.

2. A fan flow guide comprising:

a wind inlet connected to an outlet of a fan;

a wind tube portion being installed between the wind inlet and a rear end of a computer host or a central processing unit;

a thickness of the wind tube portion being smaller than that of the wind inlet so that airflow is compressed and accelerated to flow into the computer host such that heat is dissipated;

the wind tube portion is disposed between an upper side of a memory that is positioned below the fan flow guide and the computer host; and wherein a periphery of the wind tube portion is installed with a plurality of retiners so that the wind tube portion is fixed in the computer hosst by a positioning piece in a mother board.

3. A fan flow guide comprising:

a wind inlet connected to an outlet of a fan;

a wind tube portion being installed between the wind inlet and a rear end of a computer host or a central processing unit;

a thickness of the wind tube portion being smaller than that of the wind inlet so that airflow is compressed and accelerated to flow into the computer host such that heat is dissipated;

the wind tube portion is disposed between an upper side of a memory that is positioned below the fan flow guide and the computer host;

wherein the flow guide has a cover plate and a bottom plate; and wherein one end of the bottom plate is bent to be installed with a tilt portion with a plurality of wind outlets.

4. The fan flow guide as claimed in claim 1, wherein a plurality of spacers are arranged in the wind tube portion for defining a plurality of air channels.

5. The fan flow guide as claimed in claim 1, wherein the spacers have a curve shape so that adjacent spacers confine a thinner air channel.

6. The fan flow guide as claimed in claim 2, wherein a plurality of spacers are arranged in the wind tube portion for defining a plurality of air channels.

7. The fan flow guide as claimed in claim 2, wherein the spacers have a curve shape so that adjacent spacers confine a thinner air channel.

8. The fan flow guide as claimed in claim 3, wherein a plurality of spacers are arranged in the wind tube portion for defining a plurality of air channels.

9. The fan flow guide as claimed in claim 3, wherein the spacers have a curve shape so that adjacent spacers confine a thinner air channel.

* * * * *